June 15, 1954        H. B. KOCH        2,680,930
ANIMAL TRAP
Filed July 30, 1947        3 Sheets-Sheet 1
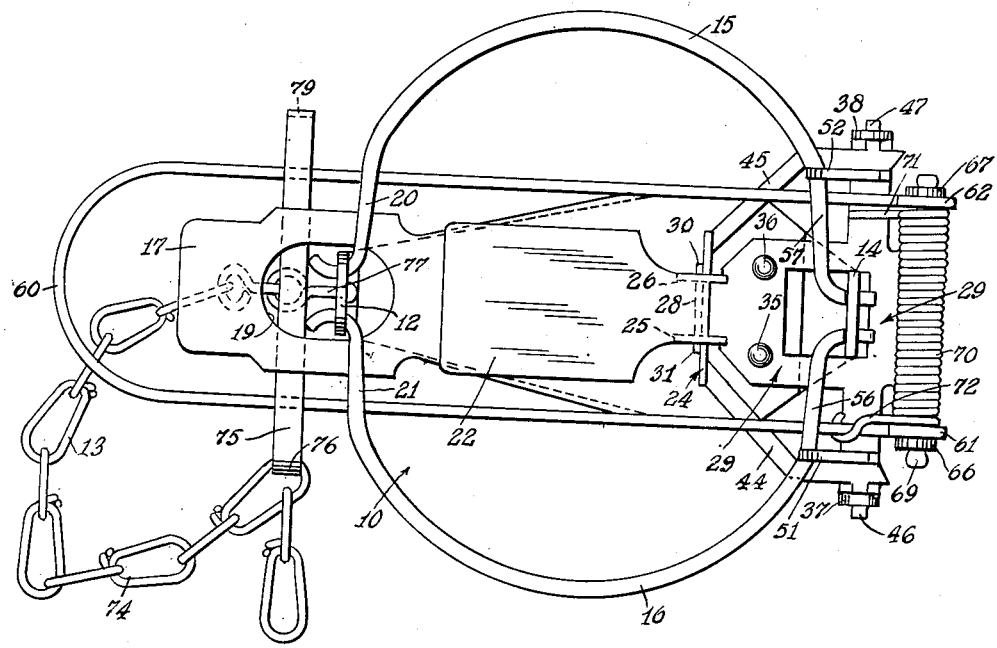
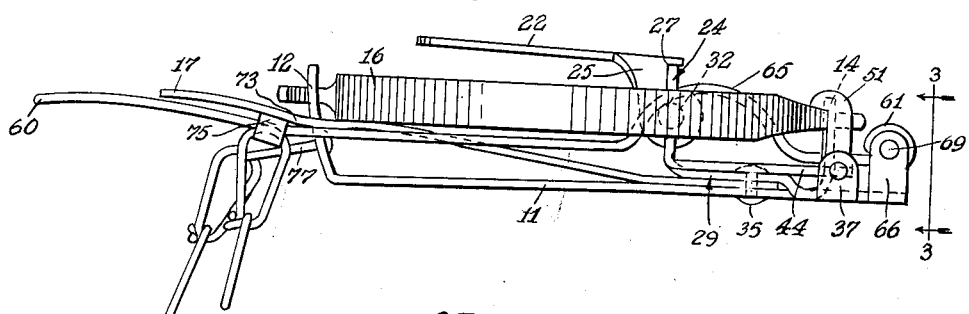
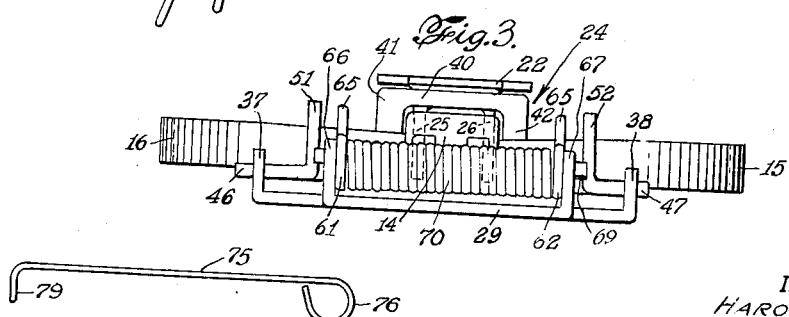
INVENTOR.
HAROLD B. KOCH
BY
Robert E. Burns
ATTORNEY.

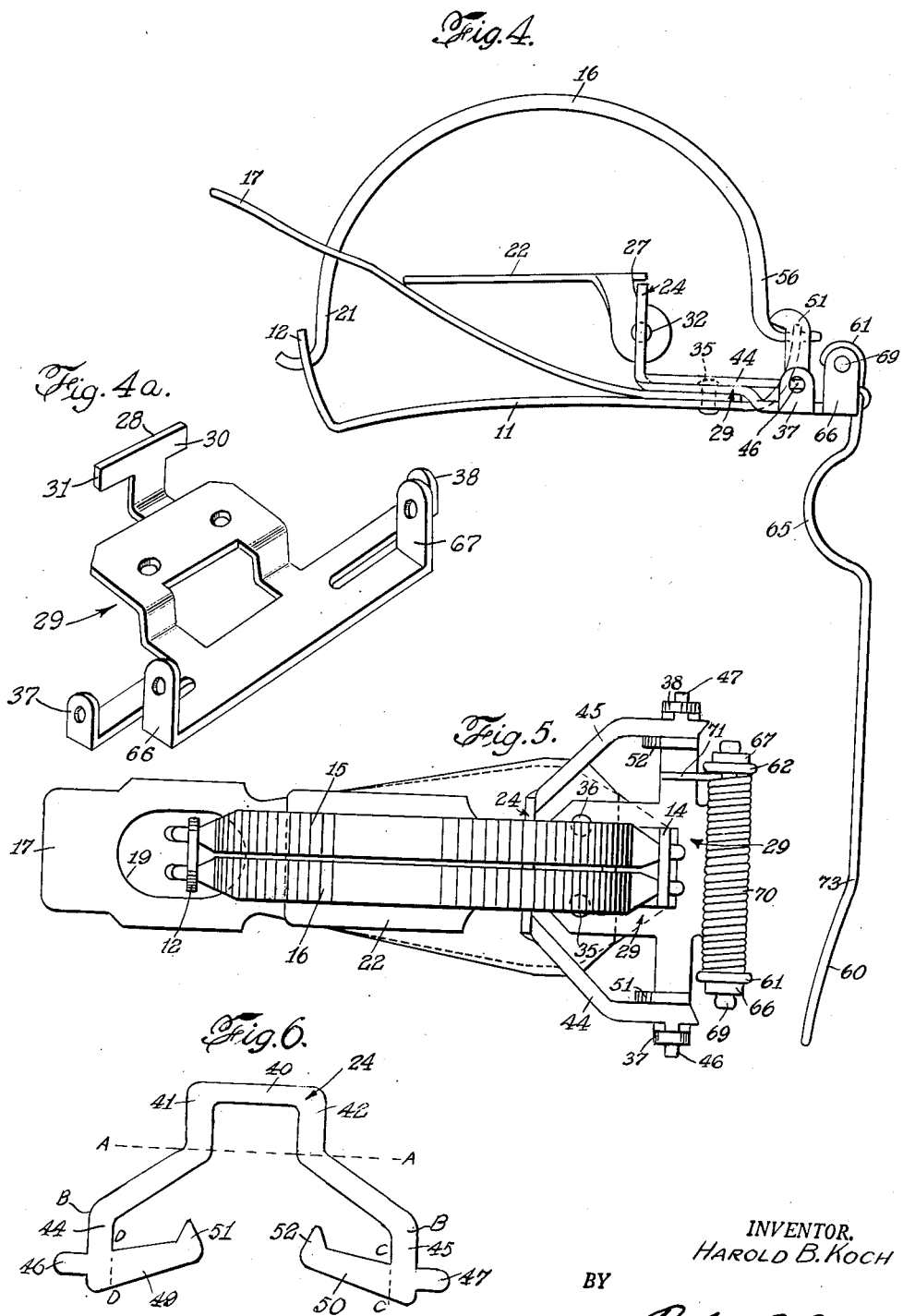

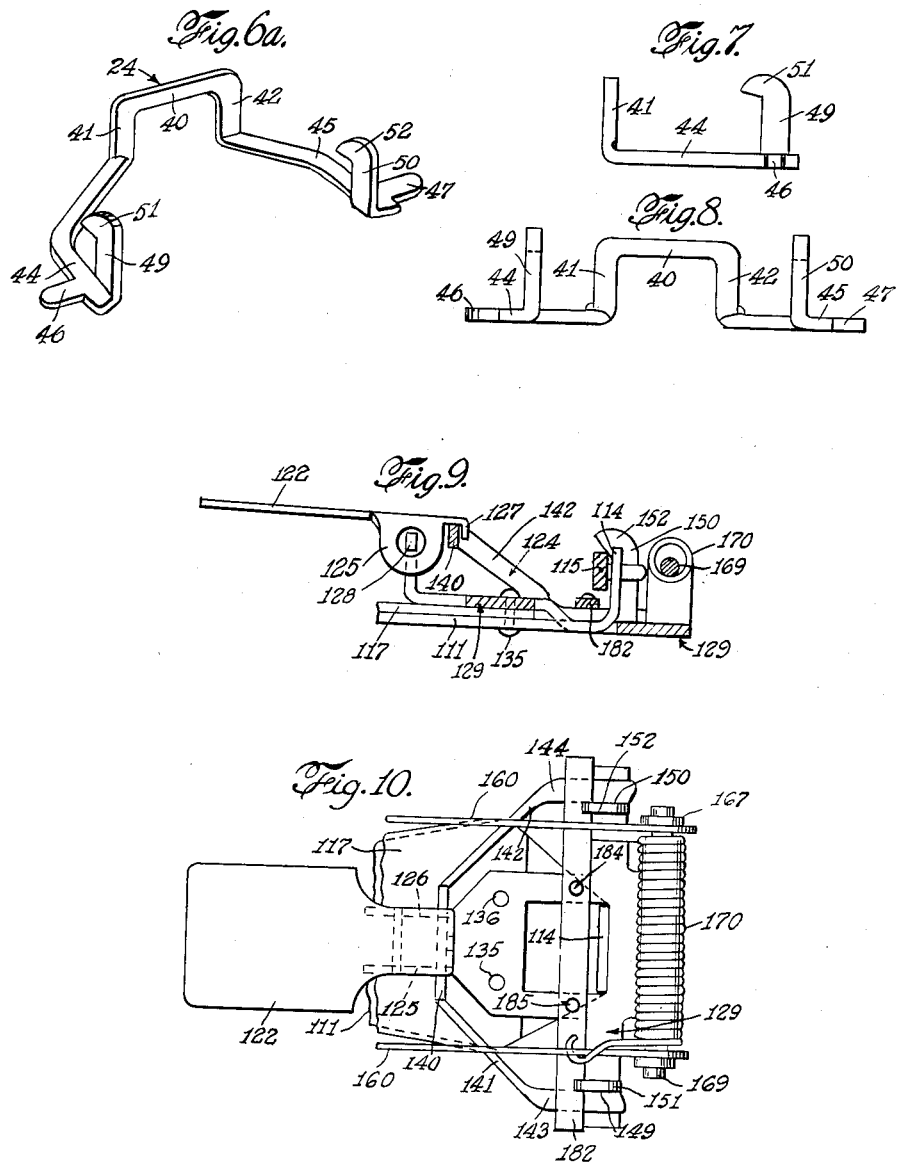

Patented June 15, 1954

2,680,930

UNITED STATES PATENT OFFICE 2,680,930

ANIMAL TRAP

Harold B. Koch, Lititz, Pa., assignor to Animal Trap Company of America, Lititz, Pa., a corporation of Pennsylvania Application July 30, 1947, Serial No. 764,688

9 Claims. (Cl. 43—95)

This invention relates to animal traps having spring actuated gripping jaws.

In an animal trap of the usual type, the gripping jaws are held in the set position by the use of a dog or latch which is secured to a cross member of the trap. The latch is adapted to be swung over one of the gripping jaws while the jaw is held in the set position. The latch is then held in position by engagement with the pan or tripping member. The trap is tripped by pressing the pan downwardly, thereby releasing the latch. The gripping jaw, under the action of the spring, throws the latch up and out of the path of the jaw as it closes. The latch is arranged to have a second degree lever action such that a slight force applied to the pan is able to easily control a much larger force stored in the actuating spring to close the gripping jaws. Consequently, a slight force in restraint of the action of the latch, such as that presented by the weight of earth or leaves spread over the trap to camouflage the setting, or the friction of water in the event the trap is set under water, may have the effect of slowing up the closing action of the gripping jaws so that the animal will get clear of the trap before the jaws close on its legs. In traps of this type, there is also a possibility that the animal may be thrown clear of the trap by the movement of the latch when it is thrown up as the jaws close. Other devices have attempted to overcome these difficulties by providing a pan or tripping member directly engaging the jaws of the trap. However, these devices have not been wholly satisfactory as the traps are not sufficiently sensitive due to the absence of a compound lever action.

The present invention aims to overcome the foregoing difficulties and disadvantages by providing a trap in which the complete mechanism of the trap excepting the tripping member, is almost entirely below the level of the jaws of the trap when it is in the set position.

In accordance with the invention, a trap is provided with a latching member the jaw engaging portions of which are movable in a direction practically parallel to a plane passing through the gripping jaws when the jaws are in the set position thus presenting a low resistance to the movement of the pan when the trap is camouflaged in the usual way or when it is placed in a water set.

An advantage of this construction is that there are no parts tending to throw the animal out of the trap as it is sprung. Further, there is a proportionately greater force available to overcome friction against the movement of the latching member inasmuch as there is only a slight movement of the latching member during the tripping of the trap, the movement being in a direction so that the member slides against any obstruction rather than pushing it away. Another advantage of this construction is that latching means are provided which are adapted to simultaneously engage both jaws of the trap.

And still another advantage is that the construction is such that the trap may be set in the same manner as traps heretofore used, so that a person skilled in setting traps with the common type of latching device would experience no difficulty in setting a trap in accordance with the present invention. Moreover, the construction is economical to manufacture and durable in use.

Other advantages of the invention will be apparent from the following description and from the accompanying drawings which show, by way of example, preferred embodiments of the invention.

In the drawings:

Fig. 1 is a plan view of a trap in accordance with the invention with the trap in set position.

Fig. 2 is a side view of the trap.

Fig. 3 is an end view of the trap looking in the direction of the arrows 3—3.

Fig. 3a is a view of a delayed action pin taken from the left hand side of Fig. 1.

Fig. 4 is a side view of the trap with the trap in the tripped position.

Fig. 4a is a perspective view of the bearing plate shown in Figs. 1, 2, 3 and 4.

Fig. 5 is a plan view of the trap shown in Fig. 4.

Fig. 6 is a plan view of a latching member before it is bent into shape.

Fig. 6a is a perspective view of the latching member of the trap.

Fig. 7 is a side view of the latch.

Fig. 8 is an end view of the latch.

Fig. 9 is a side view of a modified latch mechanism in accordance with the invention with parts in section.

Fig. 10 is a plan view corresponding to Fig. 9.

Referring to the drawings, there is shown a trap 10 comprising a base member 11 having perforated extensions 12 and 14 to support gripping jaws 15 and 16, the extension 12 being also perforated to attach the swivelled end 77 of an anchor chain 13 thereto. The gripping jaws 15 and 16 are actuated from the set to the closed position by a spring 17 having an opening 19 adapted to receive ends 20 and 21 of the jaws. The base member 11 also exercises a spring effect to aid spring 17 in closing the jaws and to provide a "jump" effect for the trap.

In order to releasably hold the jaws in the set position, a pan or treadle 22 and a latching member 24 are provided. The pan 22 has downwardly depending ears 25 and 26 having perforations 32 so that the pan may be pivotally supported thereby. The downwardly depending portions 25 and 26 are notched to provide a detent 27 adapted to releasably retain the latching member 24. The pan 22 is supported by an upward extension 28 of a transverse member or bearing plate 29 (Fig. 4a) positioned transversely of the base member 11. The extension 28 has outwardly extending ears 30 and 31 adapted to be received in the perforations 32 of the ears of the release pan. The transverse member 29 is attached to base 11 and spring 17 by rivets 35 and 36. In order to support the latching member 24, the transversely extending member 29 is provided with upwardly turned ends 37 and 38 perforated for the pivotal mounting of the latching member. The transverse member 29 is bent downwardly from the extension 28 thereof so that a flat bottom surface is provided with the base 11 of the trap.

The latching member 24 in accordance with the invention is shown in detail in Figs. 6 to 8 and as stated above is used to coact with the pan to releasably hold the gripping jaws in the set position.

The latching member 24 is formed from a blank which may be die-stamped from a flat piece of metal. In Fig. 6 there is shown a latch blank having a center portion 40 which is adapted to engage with the detent 27 of the pan 22. On opposite ends of the center section 40 are the arms 41 and 42 positioned approximately at right angles thereto. The arms 41 and 42 are on opposite sides of the pivotal ears 25 and 26 of the pan 22. In order to provide the desired spread of the ends of the latching member for the pivotal mounting thereof in the upwardly turned and perforated ends 37 and 38 of the transverse member, the arms 41 and 42 are turned outwardly from the line A—A, and thence turned inwardly as indicated at B—B to provide sections or arms 44 and 45 at right angles to the center portion 40. Outwardly extending ears 46 and 47 are formed adjacent the ends of arms 44 and 45 for the pivotal mounting of the latching member on the perforated ends 37 and 38, supra. In order for the latching member to engage with the gripping jaws, inwardly extending portions 49 and 50 are provided formed with hook portions 51 and 52, the engaging surfaces of which are inclined as shown in Fig. 6. In forming the latching member 24 from the blank shown in Fig. 6, the center portion 40 and the arms 41 and 42 are bent upwardly at the line A—A, the arm 49 is bent upwardly at line D—D, and the arm 50 is bent upwardly at line C—C as shown in Fig. 6a. Fig. 7 shows that in the formed latching member 24, the engaging surfaces of the hook portions 51 and 52 are inclined downwardly and away from the center portion 40. The spaced arms 49 and 50 thus project upwardly outside the jaws and have inwardly projecting jaw engaging portions 51 and 52 at their upper ends while the arms 44, 45, 41 and 42, together with the connecting center portion 40 may be considered as a longer pivotal third arm having a portion approximately at right angles to the arms 49 and 50 and upturned at its end to be engaged by the bait pan. The longer third arm should be at least twice as long as the shorter arms 49 and 50. It will be seen that the arms 49 and 50, together with the third arm comprising portions 40, 41, 42, 44 and 45, constitute a bell crank pivoted by the ears 46 and 47.

To facilitate engagement by the hooks 51 and 52, the ends of the gripping jaws 15 and 16 are formed with straight sections 56 and 57 approximately parallel, when in set position, to the transverse member 29. The angular surface of the hook results, in the set position, in a continual pressure being applied to the latching member by the gripping jaws tending to move the latching member away from the jaws. Thus when the release pan is tripped, the hooks easily release the jaws. By reason of the pivotal mounting of the latching member under the pivotal mounting of the ends of the gripping jaws, the movement of the hooks as the trap is tripped is along a short arc practically in a horizontal direction so that the hooks will easily slip under any camouflage material which may be placed over the jaws. Further, because of the inclined surface of the hooks, only a slight movement of the latching member releases the gripping jaws. Resetting of the trap is facilitated by the fact that the center of gravity of the latching member is to the left of the axis of the pivot ears 46 and 47, as viewed in Figs. 1 and 2, so that the action of gravity normally tends to rotate the latching member to jaw-holding position.

The trap also has a leg guard 60 which may be of the type shown in U. S. Patent 1,912,457 granted to J. U. Lehn. The leg guard is formed of a single piece of wire or other suitable material bent in U-shape and having its ends bent to form eyes 61 and 62 for the pivotal mounting thereof, the ends being bent as indicated at 65 to provide clearance for the guard past the latch member 24. To support the leg guard, the transverse member 29 is provided with perforated upwardly extending portions 66 and 67 carrying a pivot shaft 69. A coil spring 70 is positioned about the pivot shaft and has one end 71 engaging the transverse member 29 while its other end 72 forms a spring actuating arm for the leg guard so that the leg guard will tend to move in a clockwise direction as viewed in Fig. 4. The leg guard is pivotally mounted on the shaft 69 with its ends positioned outside of the ends of the coil spring 70. When the trap is in the set position, the leg guard 60 lies underneath the jaws 15 and 16 as shown in Figs. 1 and 2. When the trap is sprung, the jaws grip the leg or other portion of the body of the animal while the guard 60 swings upwardly and presses against the body of the animal to hold the animal away from the trap so that it cannot "wring-off" its leg as explained in the above mentioned patent.

The leg guard is arranged for "delayed action." If the leg guard is operated at the same time as the trap is sprung there is a possibility that the force exerted by the guard as it swings upwardly against the body of the animal may in some instances push the animal out of the trap before the jaws have gripped a portion of the body thereof. To prevent the loss of an animal in this way, the leg guard is released after a time interval has passed thus allowing the gripping jaws to completely close before the guard is actuated.

When the trap is in the set position, the leg guard 60 is held against the action of its spring 70 by a delayed action pin 75 (Figs. 1, 2 and 3a) which passes over the arms of the leg guard and under the free end portion of the spring 17. The end of the spring is preferably curved down slightly as indicated at 73 so that the delayed action pin is not liable to slip out of place by the pressure exerted by the spring 70. One end 76 of the pin 75 is attached to the anchor chain 13 at a point sufficiently removed from the point at which the chain is attached to the trap so as to leave a slack portion 74 of the chain between said points. The chain is swivelly attached to the extension 12 by the eye fastener 77. The free end portion of the delayed action pin 75 is provided with a bent end portion 79 to prevent the pin from being drawn out endwise from between the leg guard and the spring, thus assuring that the pin will not become jammed between the spring and the guard by the release of only one end thereof.

In setting the trap the leg guard 60 is turned counterclockwise with respect to its mounting and held in the set position by placing the delayed action pin 75 between the top side of the leg guard and the under side of the spring 17. The spring 17 is then pressed downwardly allowing gripping jaws 15 and 16 to fall into the open position. The latching member 24 is moved in a counter-clockwise direction about its pivots so that hooks 51 and 52 engage over the straight portions 56 and 57 of the gripping jaws. The latching member is then caught in the detent 27 of the releasing pan 22 holding the trap in the set position. It will be noted that both jaws are under spring tension, which is an advantage because upon the tripping of the trap both jaws will move upward at the same rate of speed and meet in the center of the trap. In the common type of latch only one jaw is under spring tension while the other is free.

When the trap is sprung by an animal pressing on the release pan 22, the central portion 40 of the latching member 24 is released from the detent 27 allowing the latching member to rotate about its pivotal mounting in the upwardly turned ends 37 and 38 of the transverse member 29. The hooks 51 and 52 are moved by the partial rotation of the latching member and the gripping jaws 15 and 16 are released and close on the leg of the animal. It should be noted that the motion of the hooks is along a short arc practically in a horizontal direction thus releasing the gripping jaws without an upward motion which might be impeded by camouflage, etc. Although the gripping jaws have been released the leg guard is still held down by the delayed action pin 75. However, when the animal starts to struggle in its efforts to get out from the trap, it pulls against the anchor chain 13 which has been secured to a tree, stake or other anchor (not shown). The tension of the anchor chain pulls the pin 75 out from between the leg guard and the end of the spring 17 so that the leg guard is released and swings upwardly under the action of its spring 70 to embrace the upper portion of the leg of the animal and press against its body to prevent it from "wringing off" the leg.

In Figs. 9 and 10 another embodiment of the invention is illustrated in which the latching member is adapted for sliding movement rather than for the pivotal movement previously described. In this form of the invention, correponding parts are designated by the same reference numerals as in the previous figures with the addition of 100. In Fig. 9 there is shown a pan or treadle 122 having downwardly depending ears 125 and 126 perforated for the pivotal support of the pan on an upward extension 128 of a transverse member 129. The right hand edge of the pan is formed with an extension which is bent downwardly at its end to form a detent hook 127.

The latching member 124 is formed with a flat central portion 140 adapted to engage with the detent hook 127 of the pan to releasably hold the gripping jaws in the set position. On each side of the central portion 140 are downwardly and outwardly extending arms 141 and 142. The arms are also bent and flattened to provide horizontal portions 143 and 144 for sliding mounting of the member. At the ends of the horizontal portions upward extensions 149 and 150 are provided formed with hook portions 151 and 152, the engaging surfaces of which are inclined downwardly and away from the gripping jaws. The latching member 124 is slidably supported by a flat strip 182 attached to the transverse member 129 by rivets 184 and 185 or the like. The remainder of the trap is constructed substantially as previously described.

The operation of a trap with the modified latching member is similar to that previously described, excepting that when the latching member is released from the detent hook 127 it slides outwardly away from the pan 122 being moved by the pressure of the jaws on the inclined surfaces of the hook portions 151 and 152. Thus the hooks 151 and 152 release the gripping jaws while moving in a horizontal direction and so no impediment to the action of the trap is presented by the camouflage thereover.

In Fig. 9 one of the jaws 115 is shown in section with its pivotal portion extending through the perforated extension 114.

From the preceding description it will be seen that a trap has been provided which has no parts tending to throw the animal out of the trap during the tripping thereof. The latching member has a short operating movement and thus is not impeded by the friction of camouflage material such as leaves or grass, nor by the resistance of water in a water set. The trap is economical to manufacture and of durable construction.

While the invention has been described and illustrated with reference to specific embodiments thereof, it will be understood that other embodiments may be resorted to without departing from the invention. For instance, the illustrations show the latch in connection with a jump trap with a leg guard, while the invention is equally applicable to any of the common steel traps and may be used either with or without the leg guard. Therefore, the form of the invention set out above should be considered as illustrative and not as limiting the scope of the following claims.

I claim:

1. An animal trap comprising a base, opposed gripping jaws, a spring for closing the jaws, releasing means pivotally mounted on the base between the jaws and adapted to be actuated by the animal, a latching member having a pair of spaced arms which project upwardly outside of the jaws in set position and have at their upper ends inwardly projecting jaw-engaging portions to engage the jaws and releasably hold them in set position, and a third arm disposed at approximately right angles to a plane passing through said pair of arms and upturned at its end to be engaged by the releasing means for releasably holding the latching member in jaw-holding position, and pivotal connections between the latching member and the base approximately in line with the junction of said right angle arm with the pair of arms, the center of gravity of the latching member being to one side of the pivotal axis provided by the pivotal connections so that with the base horizontal the action of gravity tends to rotate the latching member from released position to jaw-holding position.

2. An animal trap comprising a base, opposed gripping jaws, a spring for closing the jaws, a releasing member pivotally mounted on the base between the jaws and having a detent portion, a latching member pivotally mounted on the base and having a pair of spaced parallel short arms which project upwardly and have at their upper ends jaw-engaging projections for releasably holding the jaws in set position and a long arm disposed at approximately right angles to a plane passing through said pair of arms and upturned at its end to be engaged by the detent of the releasing member for releasably holding the latching member in jaw-holding position, the long arm being at least twice as long as the short arms.

3. An animal trap comprising a base, opposed gripping jaws, a spring for closing the jaws, a releasing member pivotally mounted on the base inside the jaws in set position and having a detent portion, a latching member which is U-shaped both in plan and in side elevation, the central portion of the U lying approximately horizontal adjacent the base, the end portions being turned up at approximately right angles and having their upper ends jaw-engaging projections for releasably holding the jaws in set position, and the loop portion of the U being turned up at an angle to the central portion and adapted to be engaged by the detent of the releasing member for releasably holding the latching member in jaw-holding position, and means for movably mounting the latching member on the base.

4. A trap according to claim 3 in which the latching member is pivotally mounted on the base.

5. A trap according to claim 3 in which the latching member is slidably mounted on the base.

6. An animal trap comprising a base, opposed gripping jaws, a spring for closing the jaws, a releasing member pivotally mounted on the base inside the jaws in set position and having a detent portion, a latching member comprising a bell crank lever having a pair of spaced parallel arms which project upwardly outside of the jaws in set position and have at their upper ends inwardly projecting jaw-engaging portions to engage the jaws and releasably hold them in set position, and a third arm disposed at approximately right angles to a plane passing through said pair of arms and upturned at its end to be engaged by the detent portion of the releasing member for releasably holding the latching member in jaw-holding position, and pivotal connections between the latching member and the base at approximately the angle of the bell crank lever, said pivotal connections being disposed outside of, and thus spaced farther apart than, said spaced parallel arms.

7. An animal trap comprising a base, opposed gripping jaws, a spring for closing the jaws, a releasing member pivotally mounted on the base inside the jaws in set position and having a detent portion, a latching member comprising a bell crank lever having a pair of spaced parallel arms which project upwardly outside of the jaws in set position and have at their upper ends inwardly projecting jaw-engaging portions to engage the jaws and releasably hold them in set position, and a third arm disposed at approximately right angles to a plane passing through said pair of arms and upturned at its end to be engaged by the detent portion of the releasing member for releasably holding the latching member in jaw-holding position and pivotal connections between the latching member and the base at approximately the angle of the bell crank lever, the jaw-engaging portions of said spaced parallel arms being inclined so that upward pressure of the jaws under action of said spring, when in set position, creates a torque tending to swing the latching member about its pivotal connections to release the jaws when the latching member is released by the releasing member.

8. An animal trap comprising a base, opposed gripping jaws, a spring for closing the jaws, a releasing member pivotally mounted on the base inside the jaws in set position and having a detent portion, a latching member comprising a bell crank lever having a pair of spaced parallel arms which project upwardly outside of the jaws in set position and have at their upper ends inwardly projecting jaw-engaging portions to engage the jaws and releasably hold them in set position, and a third arm disposed at approximately right angles to a plane passing through said pair of arms and upturned at its end to be engaged by the detent portion of the releasing member for releasably holding the latching member in jaw-holding position, and pivotal connections between the latching member and the base approximately at the angle of the bell crank lever, the center of gravity of the latching member being to one side of the pivotal axis provided by the pivotal connections so that with the base horizontal the action of gravity provides a torque tending to rotate the latching member from released position to jaw-holding position, the jaw-engaging portions of said spaced parallel arms being inclined so that upward pressure of the jaws under action of said spring, when in set position, creates a torque in a direction opposite to and substantially greater than the torque provided by the action of gravity so as to swing the latching member about its pivotal connections to instantly release the jaws when the latching member is released by the releasing member.

9. An animal trap comprising a base, opposed gripping jaws, a spring for closing the gripping jaws, releasing means pivotally mounted on the base between the jaws and adapted to be actuated by the animal, a U-shaped latching member having spaced arms which project upwardly outside of the jaws in set position and have at their upper ends inwardly projecting jaw-engaging portions inclined at an obtuse angle to said arms, spaced horizontal portions extending beneath the jaws, and an upwardly projecting portion disposed between the jaws in set position and adapted to be releasably engaged by the releasing means to hold the latching member releasably against movement outwardly of the jaws by the reaction of the jaws pressing against said inclined jaw-engaging surfaces, and means for movably mounting the latching member on the base.

References Cited in the file of this patent

UNITED STATES PATENTS

| Number | Name | Date |
|---|---|---|
| 409,467 | Kelley | Aug. 20, 1889 |
| 868,917 | Donlon | Oct. 22, 1907 |
| 1,546,515 | Smith | July 21, 1925 |
| 1,912,457 | Lehn | June 6, 1933 |
| 2,201,307 | Culbertson | May 21, 1940 |
| 2,216,919 | Lehn | Oct. 8, 1940 |
| 2,282,485 | Lehn et al. | May 12, 1942 |
| 2,526,826 | Olds | Oct. 24, 1950 |
| 2,568,344 | Lehn | Sept. 18, 1951 |

FOREIGN PATENTS

| Number | Country | Date |
|---|---|---|
| 732,422 | France | June 14, 1932 |